United States Patent
Shim et al.

(10) Patent No.: US 9,456,160 B2
(45) Date of Patent: Sep. 27, 2016

(54) IMAGE SENSOR

(71) Applicants: Hee Sung Shim, Gangneung-si (KR); Yong In Han, Seoul (KR)

(72) Inventors: Hee Sung Shim, Gangneung-si (KR); Yong In Han, Seoul (KR)

(73) Assignee: Dongbu HiTek Co., Ltd., Bucheon-si (KR)

( * ) Notice: Subject to any disclaimer, the term of this patent is extended or adjusted under 35 U.S.C. 154(b) by 0 days.

(21) Appl. No.: 14/684,706

(22) Filed: Apr. 13, 2015

(65) Prior Publication Data
US 2016/0037112 A1    Feb. 4, 2016

(30) Foreign Application Priority Data

Jul. 29, 2014  (KR) .................. 10-2014-0096391

(51) Int. Cl.
| | |
|---|---|
| H04N 3/14 | (2006.01) |
| H04N 5/335 | (2011.01) |
| H04N 5/378 | (2011.01) |
| H04N 5/347 | (2011.01) |
| H04N 5/353 | (2011.01) |

(52) U.S. Cl.
CPC .............. *H04N 5/378* (2013.01); *H04N 5/347* (2013.01); *H04N 5/3535* (2013.01)

(58) Field of Classification Search
CPC .. H04N 5/378; H04N 5/2353; H04N 5/3765; H04N 5/347; H04N 5/3535
USPC ........ 348/294–324; 250/208.1; 257/290–292
See application file for complete search history.

(56) References Cited

U.S. PATENT DOCUMENTS

| | | | |
|---|---|---|---|
| 6,888,568 B1 | 5/2005 | Neter | |
| 7,554,584 B2 | 6/2009 | Lim | |
| 9,137,452 B2 * | 9/2015 | Han | ..................... H04N 5/2353 |
| 2005/0185075 A1 | 8/2005 | Neter | |
| 2005/0206752 A1 | 9/2005 | Lim | |
| 2009/0167915 A1 * | 7/2009 | Hirota | ................... H04N 5/357 348/302 |
| 2013/0001402 A1 * | 1/2013 | Ogushi | ............... H04N 5/3456 250/208.1 |

FOREIGN PATENT DOCUMENTS

KR         100994993         11/2010

OTHER PUBLICATIONS

Office Action dated May 15, 2015; Korean Patent Application No. 10-2014-0096391; 4 pgs.; Korean Intellectual Property Office, Republic of Korea.

* cited by examiner

*Primary Examiner* — Yogesh Aggarwal

(74) *Attorney, Agent, or Firm* — Andrew D. Fortney; Central California IP Group, P.C.

(57) ABSTRACT

Disclosed is an image sensor. The disclosed image sensor includes a pixel array including a plurality of unit pixels arranged in a matrix form having rows and columns, a binning sampling unit configured to output a binning sampling signal according to an average of signals from two or more unit pixels selected from among the unit pixels of each of the columns, and an analog-to-digital converter configured to convert the binning sampling signal to a digital signal. The selected unit pixels have different exposure times.

12 Claims, 7 Drawing Sheets

IMAGE SENSOR

This application claims the benefit of Korean Patent Application No. 10-2014-0096391, filed on Jul. 29, 2014, which is hereby incorporated by reference as if fully set forth herein.

BACKGROUND OF THE INVENTION

1. Field of the Invention

Embodiments relate to an image sensor.

2. Discussion of the Related Art

Image sensors, in particular, complementary metal-oxide semiconductor (CMOS) image sensors, may include a frame comprising N×M unit pixels.

Such an image sensor may use a low resolution mode when it is necessary to increase a data processing rate (for example, in a moving image mode). In the low resolution mode, not all unit pixels may output signals. In other words, only some of the unit pixels may output signals. The low resolution mode of the image sensor may be implemented using a sub-sampling mode and a binning mode.

In order to operate the image sensor at a resolution corresponding to ¼ of full resolution, for example, in the sub-sampling mode, outputs may be generated from N/2× M/2 unit pixels among a total of N×M unit pixels. In the binning mode, outputs of two or more unit pixels of the same color may be summed, and summed results may be output as an output value of one unit pixel.

In the binning mode, it may be necessary to use a separate memory for storing outputs of unit pixels of the same color in order to achieve summing of the outputs. For this reason, the size of the image sensor may be unavoidably increased.

SUMMARY OF THE INVENTION

Embodiments of the present invention provide an image sensor which does not require a separate line memory for binning after analog-to-digital conversion, while being capable of achieving an enhancement in the analog-to-digital conversion rate.

Additional advantages, objects, and features of embodiments of the invention will be set forth in part in the description which follows and in part will become apparent to those having ordinary skill in the art upon examination of the following or may be learned from practice of the embodiments. The objectives and other advantages of the embodiments may be realized and attained by the structure(s) particularly pointed out in the written description and claims hereof as well as the appended drawings.

To achieve these objects and other advantages and in accordance with the purpose of the embodiments, as embodied and broadly described herein, an image sensor may include a pixel array comprising a plurality of unit pixels in a matrix having rows and columns, a binning sampling unit configured to output a binning sampling signal according to an average of signals from two or more unit pixels from among the unit pixels in a corresponding one of the columns, and an analog-to-digital converter configured to convert the binning sampling signal to a digital signal, wherein the two or more unit pixels have different exposure times.

The number of the selected unit pixels may be two, and/or the two or more unit pixels may be of the same color.

The signal output from each of the two or more unit pixels may be a reset sensing signal or an image sensing signal. The reset sensing signal may be a signal from the unit pixel when the unit pixel is reset, and the image sensing signal may be a signal from the unit pixel in accordance with an image signal.

The binning sampling unit may output a first binning sampling signal according to an average of the reset sensing signals from the two or more unit pixels, and may output a second binning sampling signal according to an average of the image sensing signals from the two or more unit pixels.

Exposure times of the two or more unit pixels may have a ratio of 1:3.

The binning sampling unit may include a first averaging unit configured to calculate or determine the average of the reset sensing signals, and a second averaging unit configured to calculate or determine the average of the image sensing signals.

The image sensor may further include a sensing line connected to one or more output stages of or in (e.g., in the unit pixels of) one of the columns.

The first averaging unit may include a first capacitor receiving a first reference voltage (e.g., at one end or a first electrode), a second capacitor receiving the first reference voltage (e.g., at one end or a first electrode), a first switch between the first capacitor (e.g., at another end or a second electrode) and the sensing line, a second switch between the second capacitor (e.g., at another end or a second electrode) and the sensing line, and a third switch between the first capacitor and the second capacitor (e.g., between the second electrodes thereof).

The first to third switches may be configured to store (e.g., in accordance with switching operations) a first reset sensing signal from one of the unit pixels in the first capacitor, and a second reset sensing signal from another of the unit pixels in the second capacitor.

The second averaging unit may include a third capacitor receiving a second reference voltage (e.g., at one end or a first electrode), a fourth capacitor receiving the second reference voltage (e.g., at one end or a first electrode), a fourth switch between the third capacitor (e.g., at another end or a second electrode) and the sensing line, a fifth switch between the fourth capacitor (e.g., at another end or a second electrode) and the sensing line, and a sixth switch between the third capacitor and the fourth capacitor (e.g., between the second electrodes).

The fourth to sixth switches may be configured to store (e.g., in accordance with switching operations) a first image sensing signal from one of the unit pixels in the third capacitor, and a second image sensing signal from another of the unit pixels in the fourth capacitor.

Another aspect of the present invention relates to an image sensor that includes a pixel array comprising a plurality of unit pixels in a matrix having rows and columns, a binning sampling unit configured to amplify signals from two or more unit pixels from among the unit pixels of one of the columns and to output a binning sampling signal according to an average of the amplified signals, and an analog-to-digital converter configured to convert the binning sampling signal to a digital signal, wherein the signals output from the two or more unit pixels are amplified with different gains.

The image sensor may further include a sensing line connected to one or more output stages of or in one of the columns. The number of the selected unit pixels may be two, and/or the selected unit pixels may be of the same color.

The signal from each of the unit pixels may be a reset sensing signal or an image sensing signal. The reset sensing signal may be a signal from the unit pixel when the unit pixel is reset, and the image sensing signal may be a signal from the unit pixel in accordance with an image signal.

The binning sampling unit may include a variable amplifying unit configured to amplify the reset sensing signals and image sensing signals from the unit pixels and output the amplified reset sensing signals and the amplified image sensing signals, a first averaging unit configured to calculate or determine an average of the amplified reset sensing signals, and a second averaging unit configured to calculate or determine an average of the amplified image sensing signals. The variable amplifying unit may amplify the reset sensing signals from the unit pixels with different gains, and may amplify the image sensing signals from the unit pixels with different gains.

The first and second averaging units may be the same as those in the previous aspect.

The variable amplifying unit may amplify a first reset sensing signal and a first image sensing signal with a first gain, and the first reset sensing signal and the first image sensing signal may be supplied from one of the unit pixels via the sensing line. The variable amplifying unit may amplify a second reset sensing signal and a second image sensing signal with a second gain, and the second reset sensing signal and the second image sensing signal may be supplied from another of the unit pixels via the sensing line.

In accordance with embodiments of the invention, it may be unnecessary to provide a separate memory for binning after analog-to-digital. It may also be possible to achieve an enhancement in the analog-to-digital conversion rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
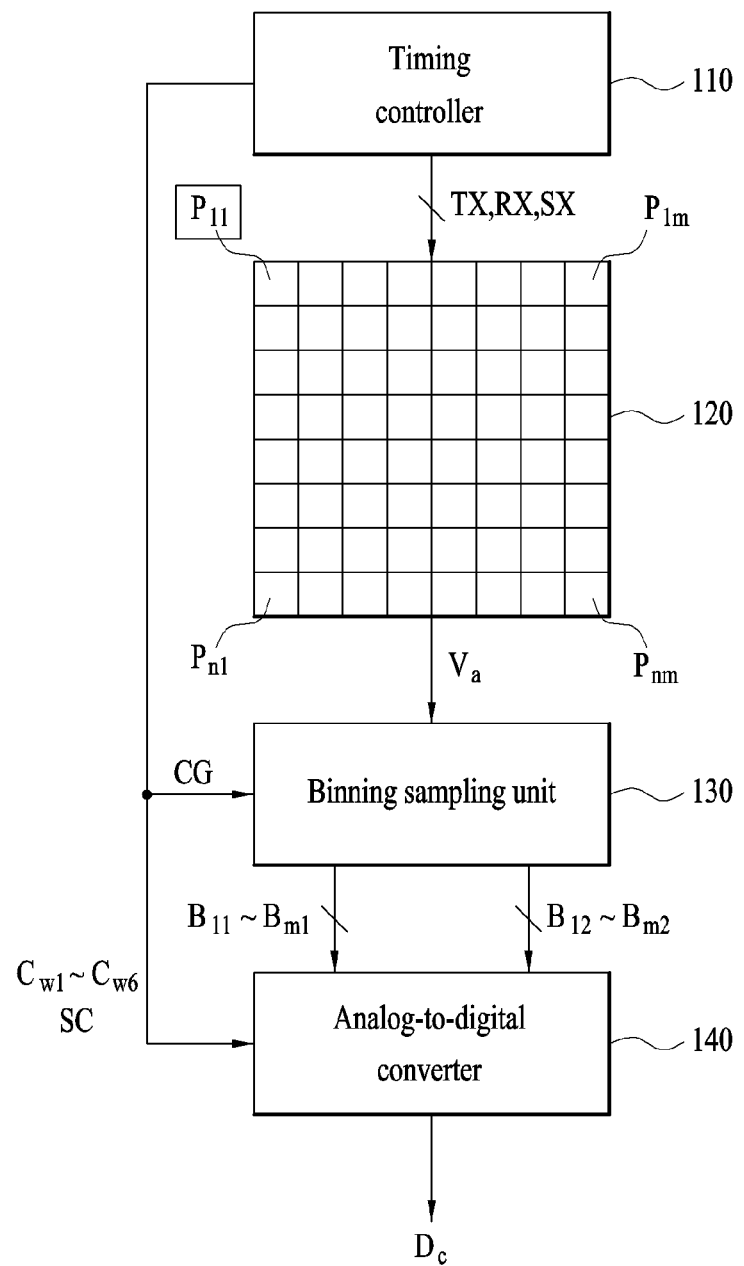
FIG. 1 is a block diagram of an exemplary image sensor according to one or more embodiments of the invention.

Hereinafter, various embodiments of the invention will be described in detail with reference to the annexed drawings for better understanding. In the following description, it will be understood that, when an element such as a layer (film), region, pattern, or structure is referred to as being "on" or "under" another element, it can be directly on or under another element or can be indirectly formed such that an intervening element is also present. In addition, terms such as "on" or "under" should be understood on the basis of the drawings.

In the drawings, dimensions of layers may be exaggerated, omitted or schematically illustrated for clarity and convenience of description. In addition, dimensions of constituent elements do not necessarily reflect the actual dimensions thereof. The same reference numerals denote the same constituent elements.

Figure 2:
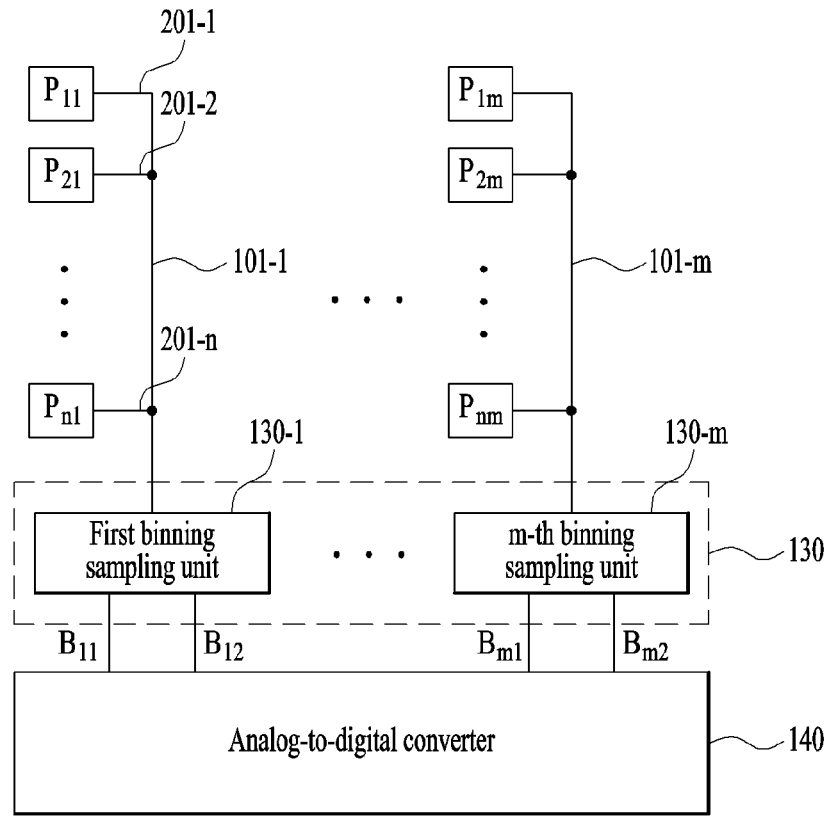
FIG. 2 is a diagram illustrating embodiments of an exemplary pixel array, binning sampling unit, and analog-to-digital converter suitable for use in the exemplary image sensor illustrated in FIG. 1.

FIG. 1 illustrates a block diagram of an image sensor according to one or more embodiments of the invention. FIG. 2 illustrates embodiments of an exemplary pixel array 120, binning sampling unit 130, and analog-to-digital converter 140 suitable for use in the exemplary image sensor illustrated in FIG. 1.

Referring to FIGS. 1 and 2, the image sensor, which is designated by reference numeral "100", includes a timing controller 110 in addition to the pixel array 120, binning sampling unit 130, and analog-to-digital converter 140.

The timing controller 110 outputs control signals configured to control the pixel array 120 and/or pixels in the pixel array 120 (for example, a reset signal RX, a transmission signal TX, and a selection signal SX), switch control signals CW1 to CW6, a gain control signal CG, and one or more control signals SC configured to control the analog-to-digital converter 130.

The pixel array 120 may include a plurality of unit pixels P11 to Pnm (where m and n are natural numbers greater than 1). The unit pixels P11 to Pnm may be arranged in a matrix having rows and columns. Each of the unit pixels P11 to Pnm may include a photovoltaic element, a reset transistor receiving the reset signal RX, a transmission transistor receiving the transmission signal TX, a floating diffusion region FD receiving charge from the photovoltaic element upon activation of the transmission signal TX, and a select transistor receiving the selection signal SX.

The pixel array 120 may include sensing lines 101-1 to 101-$m$, each connected to one or more output stages in or of a corresponding column of the unit pixels P11 to Pnm.

The binning sampling unit 130 calculates an average of the outputs of two or more unit pixels from among the unit pixels P11 to Pn1, P12 to Pn2, . . . or P1$m$ to Pnm in each column of the pixel array 120. The unit pixels in a given column may be selected by activating the corresponding selection signal SX to the unit pixels. In this case, the selected unit pixels may have different exposure times. That is, outputs of the selected unit pixels may be outputs according to different exposure times.

Here, the exposure time of each unit pixel may be a period from a time from completion of a photodiode reset operation in the unit pixel to a time when the charges generated by light received by the photodiode are transmitted to a floating diffusion region in the unit pixel.

The binning sampling unit 130 may include first to m-th binning sampling units 130-1 to 130-m (m being a natural number greater than 1) connected to respective sensing line 101-1 to 101-m.

For example, each of the first to m-th binning sampling units 130-1 to 130-m may be connected to a corresponding one of the sensing lines 101-1 to 101-m.

Each of the first to m-th binning sampling units 130-1 to 130-m may calculate an average of the outputs of two unit pixels selected from among the unit pixels P11 to Pn1, P12 to Pn2, . . . or P1m to Pnm in a corresponding column of the pixel array 120 via a corresponding one of the sensing lines 101-1 to 101-m.

The two unit pixels selected for binning may be of the same color. In this case, the selected unit pixels may be blue pixels, red pixels, or green pixels.

Signals output from the selected unit pixels may be reset sensing signals or image sensing signals. In this case, the reset sensing signals may be signals output from the unit pixels when the unit pixels are reset. The image sensing signals may be output from the unit pixels based on charges generated from photodiodes in the unit pixels in accordance with an image signal or a video signal.

Each of the first to m-th binning sampling units 130-1 to 130-m (m being a natural number greater than 1) may output a first binning sampling signal B11, B21, . . . or Bm1 based on an average of the reset sensing signals output from the selected unit pixels.

In addition, each of the first to m-th binning sampling units 130-1 to 130-m (m being a natural number greater than 1) may output a second binning sampling signal B12, B22, . . . or Bm2 based on an average of the image sensing signals output from the selected unit pixels.

The first to m-th binning sampling units 130-1 to 130-m (m being a natural number greater than 1) may have the same configuration.

Figure 3:
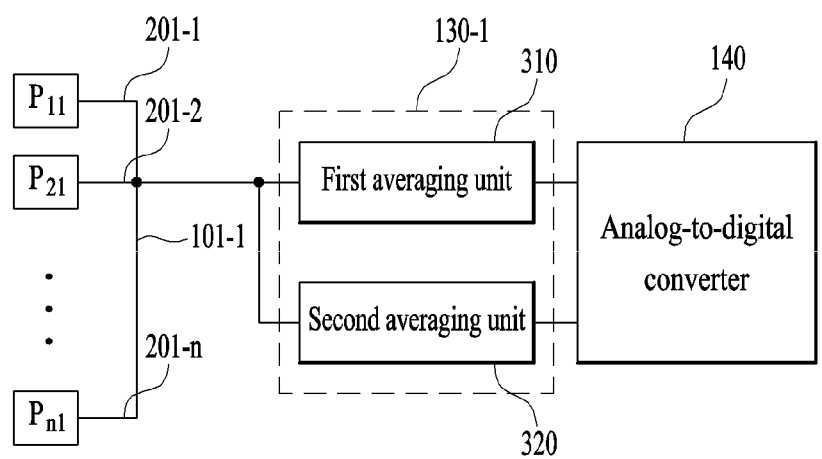
FIG. 3 is a diagram illustrating an exemplary first binning sampling unit suitable for use in the exemplary image sensor illustrated in FIG. 2 according to one or more embodiments of the invention.

FIG. 3 illustrates an embodiment of the first binning sampling unit 130-1 suitable for use in the exemplary image sensor illustrated in FIG. 2.

Referring to FIG. 3, the first binning sampling unit 130-1 includes a first averaging unit 310 and a second averaging unit 320 connected to a corresponding sensing line, namely, the first sensing line 101-1.

The first averaging unit 310 may calculate an average of reset sensing signals output from the unit pixels selected from among the unit pixels P11 to Pn1 (n being a natural number greater than 1) connected to the first sensing line 101-1.

The second averaging unit 320 may calculate an average of image sensing signals output from the unit pixels selected from among the unit pixels P11 to Pn1 (n being a natural number greater than 1) connected to the first sensing line 101-1.

Figure 4:
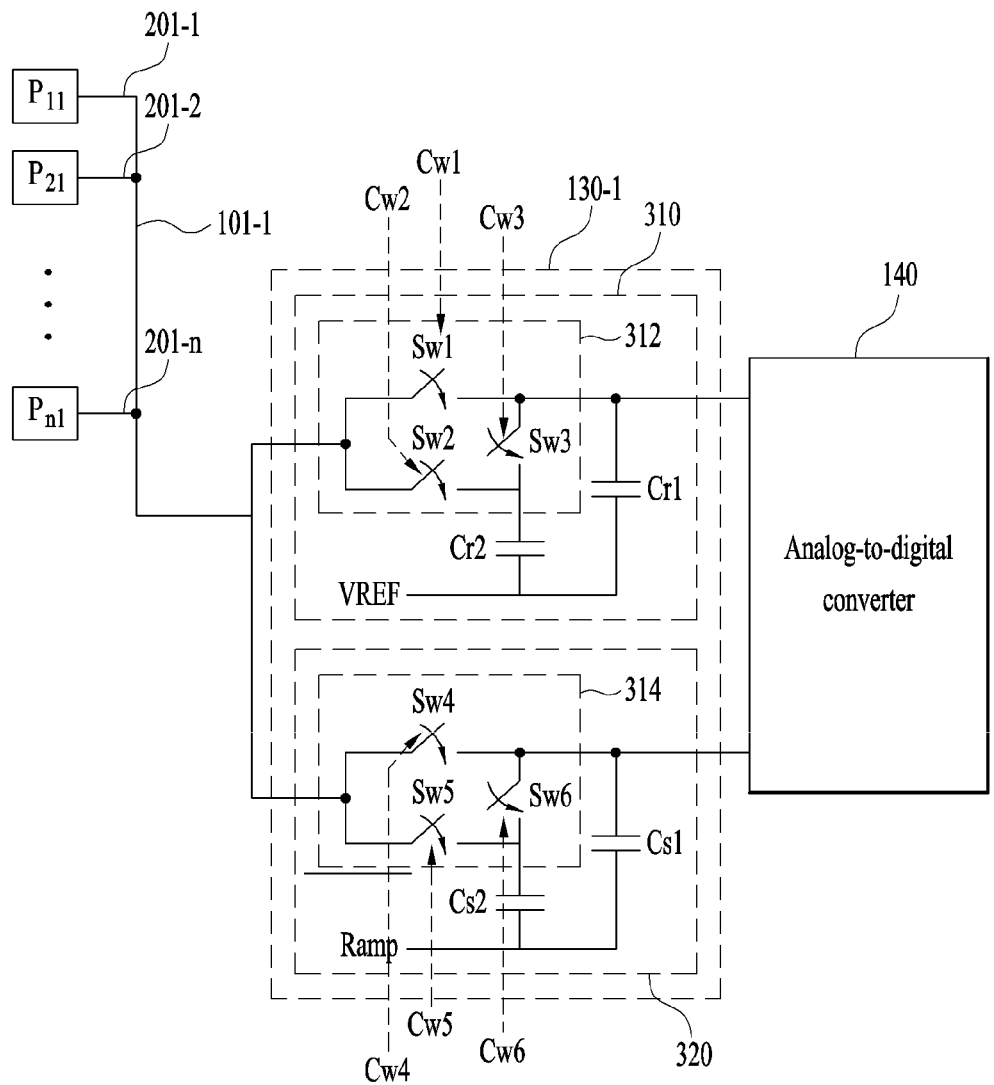
FIG. 4 is a diagram illustrating exemplary first and second averaging units suitable for use in the exemplary binning sampling unit illustrated in FIG. 3 according to one or more embodiments of the invention.

FIG. 4 illustrates an embodiment of the first and second averaging units 310 and 320 suitable for use in the exemplary binning sampling unit illustrated in FIG. 3.

Referring to FIG. 4, the first averaging unit 310 includes a first capacitor Cr1, a second capacitor Cr2, and a first switching unit 312. The second averaging unit 320 includes a third capacitor Cs1, a fourth capacitor Cs2, and a second switching unit 314.

A first reference voltage VREF may be applied to one end or electrode of the first capacitor Cr1.

The first reference voltage VREF may also be applied to one end or electrode of the second capacitor Cr2.

A second reference voltage Ramp may be applied to one end or electrode of the third capacitor Cs1.

The second reference voltage Ramp may also be applied to one end or electrode of the fourth capacitor Cs2.

For example, the first reference voltage VREF may be a DC voltage having a predetermined level. The second reference voltage Ramp may be a ramp voltage having a level that varies (e.g., rises and/or falls) in accordance with passage of time or as a function of time.

In response to first to third switch control signals CW1 to CW3, the first switching unit 312 may connect another end or a second electrode of the first capacitor Cr1 and/or another end or a second electrode of the second capacitor Cr2 to the first sensing line 101-1, disconnect the other end or second electrode of the first capacitor Cr1 or the other end or second electrode of the second capacitor Cr2 from the first sensing line 101-1, and/or connect the other end or second electrode of the first capacitor Cr1 and the other end or second electrode of the second capacitor Cr2.

In response to fourth to sixth switch control signals CW4 to CW6, the second switching unit 314 may connect another end or a second electrode of the third capacitor Cs1 or another end or a second electrode of the fourth capacitor Cs2 to the first sensing line 101-1, disconnect the other end or second electrode of the third capacitor Cs1 or the other end or second electrode of the fourth capacitor Cs2 from the first sensing line 101-1, and/or connect the other end or second electrode of the third capacitor Cs1 and the other end or second electrode of the fourth capacitor Cs2.

For example, the first switching unit 312 may store in the first capacitor Cr1 a first reset sensing signal output from one of the unit pixels selected from among the unit pixels P11 to Pn1 (n being a natural number greater than 1) connected to the first sensing line 101-1, in response to the switch control signals CW1 to CW3 having states connecting the second electrode of the first capacitor Cr1 to the first sensing line 101-1 and disconnecting the second electrode of the second capacitor Cr2 from the first sensing line 101-1. Hereinafter, the unit pixel outputting the first reset sensing signal will be referred to as a "first unit pixel".

The second switching unit 314 may store in the third capacitor Cs1 a first image sensing signal output from the first unit pixel, in response to the switch control signals CW4 to CW6 having states connecting the second electrode of the third capacitor Cs1 to the first sensing line 101-1 and disconnecting the second electrode of the fourth capacitor Cs1 from the first sensing line 101-1.

The first reset sensing signal may be a signal output from the first unit pixel when the first unit pixel is reset. The first image sensing signal may be a signal output from the first unit pixel in accordance with an image signal or a video signal.

The first switching unit 312 may store in the second capacitor Cr2 a second reset sensing signal output from another of the unit pixels selected from among the unit pixels P11 to Pn1 (n being a natural number greater than 1) connected to the first sensing line 101-1, in response to the switch control signals CW1 to CW3 having states connecting the second electrode of the second capacitor Cr2 to the first sensing line 101-1 and disconnecting the second electrode of the first capacitor Cr1 from the first sensing line 101-1. Hereinafter, the unit pixel outputting the second reset sensing signal will be referred to as a "second unit pixel".

The second switching unit 314 may store, in the fourth capacitor Cs2 thereof, a second image sensing signal output from the second unit pixel, in response to the switch control signals CW4 to CW6 having states connecting the second electrode of the fourth capacitor Cs2 to the first sensing line 101-1 and disconnecting the second electrode of the third capacitor Cs1 from the first sensing line 101-1.

The second reset sensing signal may be a signal output from the second unit pixel when the second unit pixel is reset. The second image sensing signal may be a signal output from the second unit pixel in accordance with an image signal or a video signal.

In addition, the first switching unit 312 may connect the other end or second electrode of the first capacitor Cr1 and the other end or second electrode of the second capacitor Cr2 in order to calculate an average of the first reset sensing signal stored in the first capacitor Cr1 and the second reset sensing signal stored in the second capacitor Cr2, in response to the switching control signals CW1 to CW3 having states connecting the second electrode of the second capacitor Cr2 to the second electrode of the first capacitor Cr1.

Meanwhile, the second switching unit 314 may connect the other end or second electrode of the third capacitor Cs1 and the other end or second electrode of the fourth capacitor Cs2 in order to calculate an average of the second image sensing signal stored in the third capacitor Cs1 and the second image sensing signal stored in the fourth capacitor Cs2, in response to the switching control signals CW4 to CW6 having states connecting the second electrode of the fourth capacitor Cs2 to the second electrode of the third capacitor Cs1.

The switching control signals CW1 to CW6 may be supplied from the timing controller 110.

The first switching unit 132 may include first to third switches SW1 to SW3.

The first switch SW1 is connected between the other end or second electrode of the first capacitor Cr1 and the sensing line 101-1. The first switch SW1 may perform a switching operation (e.g., connect or disconnect the first capacitor Cr1 and the sensing line 101-1) in response to the third switch control signal CW1.

The second switch SW2 is connected between the other end or second electrode of the second capacitor Cr2 and the sensing line 101-1. The second switch SW2 may perform a switching operation (e.g., connect or disconnect the second capacitor Cr2 and the sensing line 101-1) in response to the second switch control signal CW2.

The third switch SW3 is connected between the other end or second electrode of the first capacitor Cr1 and the other end or second electrode of the second capacitor Cr2. The third switch SW3 may perform a switching operation (e.g., connect or disconnect the second electrodes of the first capacitor Cr1 and the second capacitor Cr2) in response to the third switch control signal CW3.

The second switching unit 134 may include fourth to sixth switches SW4 to SW6.

The fourth switch SW4 is connected between the other end or second electrode of the third capacitor Cs1 and the sensing line 101-1. The fourth switch SW4 may perform a switching operation (e.g., connect or disconnect the third capacitor Cs1 and the sensing line 101-1) in response to the fourth switch control signal CW4.

The fifth switch SW5 is connected between the other end or second electrode of the fourth capacitor Cs2 and the sensing line 101-1. The fifth switch SW5 may perform a switching operation (e.g., connect or disconnect the fourth capacitor Cs2 and the sensing line 101-1) in response to the fifth switch control signal CW5.

The sixth switch SW6 is connected between the other end or second electrode of the third capacitor Cs1 and the other end or second electrode of the fourth capacitor Cs2. The sixth switch SW6 may perform a switching operation (e.g., connect or disconnect the second electrodes of the fourth capacitor Cs2 and the third capacitor Cs1) in response to the sixth switch control signal CW6.

The columns of unit pixels P12 to Pn2 . . . P1$m$ to Pnm of the pixel array 120 may have the same configuration as that shown in FIG. 4.

Figure 5:
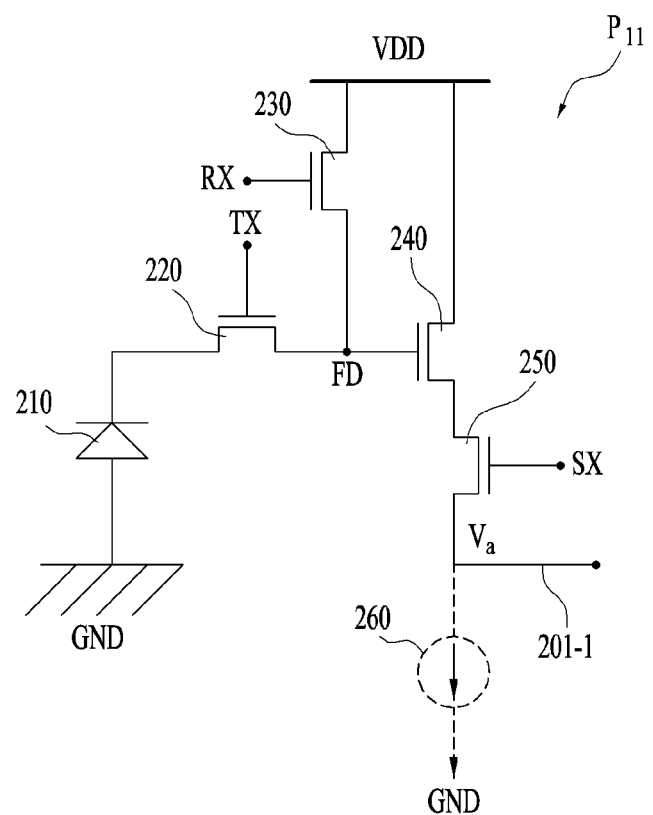
FIG. 5 is a diagram illustrating an exemplary unit pixel suitable for use in the exemplary image sensor illustrated in FIG. 1 according to one or more embodiments of the invention.

FIG. 5 illustrates a circuit diagram of an exemplary unit pixel P11 suitable for us in the exemplary image sensor illustrated in FIG. 1.

Referring to FIG. 5, the unit pixel P11 may include a photodiode 210, a transfer transistor 220, a reset transistor 230, a driver transistor 240, and a select transistor 250.

The photodiode 210 is connected between a first voltage GND and the transfer transistor 220. The photodiode 210 may absorb light and generate electrical carriers or charges from the absorbed light. For example, the first voltage GND may be a ground voltage (e.g., about 0 V).

The transfer transistor 220 is connected between a floating node FD and the photodiode 210. The transfer transistor 220 may be controlled by the transfer signal TX supplied from the timing controller 110.

In response to the transfer signal TX, the transfer transistor 220 may transfer the electrical charges or carriers from the photodiode 210 to the floating node FD (or vice versa). In this case, the floating node FD may be a floating diffusion region.

The reset transistor 230 is connected between a second voltage VDD and the floating node FD. The reset transistor 230 may be controlled by the reset signal RX supplied from the timing controller 110. The reset transistor 230 may reset the unit pixel in response to the reset signal RX.

For example, when the reset transistor 230 turns on, the second voltage VDD may be applied to the floating node FD. In accordance with application of the second voltage VDD, charges at the floating node FD may be removed (or brought to a level equal to or substantially equal to the second voltage VDD) and, as such, the floating node FD may be reset.

The driver transistor 240 is connected between the second voltage VDD and one end or terminal of the select transistor 250 (for example, a source or a drain). The gate of the driver transistor 240 is connected to the floating node FD.

The driver transistor 240 may be controlled in response to a voltage at the floating node FD. The driver transistor 240 may constitute a source follower, along with a current source 260 outside the unit pixel P11. In this case, the driver transistor 240 may function as a buffer.

The select transistor 250 is connected between the driver transistor 240 and the current source 260. The select transistor 250 may select the corresponding unit pixel of the pixel array 120 (namely, the unit pixel P11) in response to the select signal SX configured to select unit pixels of the pixel array 120. In one or more embodiments, the select signal SX selects a row of unit pixels of the pixel array 120.

The source of the select transistor 250 may be an output terminal 201-1 of the unit pixel P11 and, as such, may be connected to the sensing line 101-1. In this case, a sensing signal Va (for example, a reset sensing signal or an image sensing signal) may be output from the output terminal 201-1 of the select transistor 250.

Figure 6:
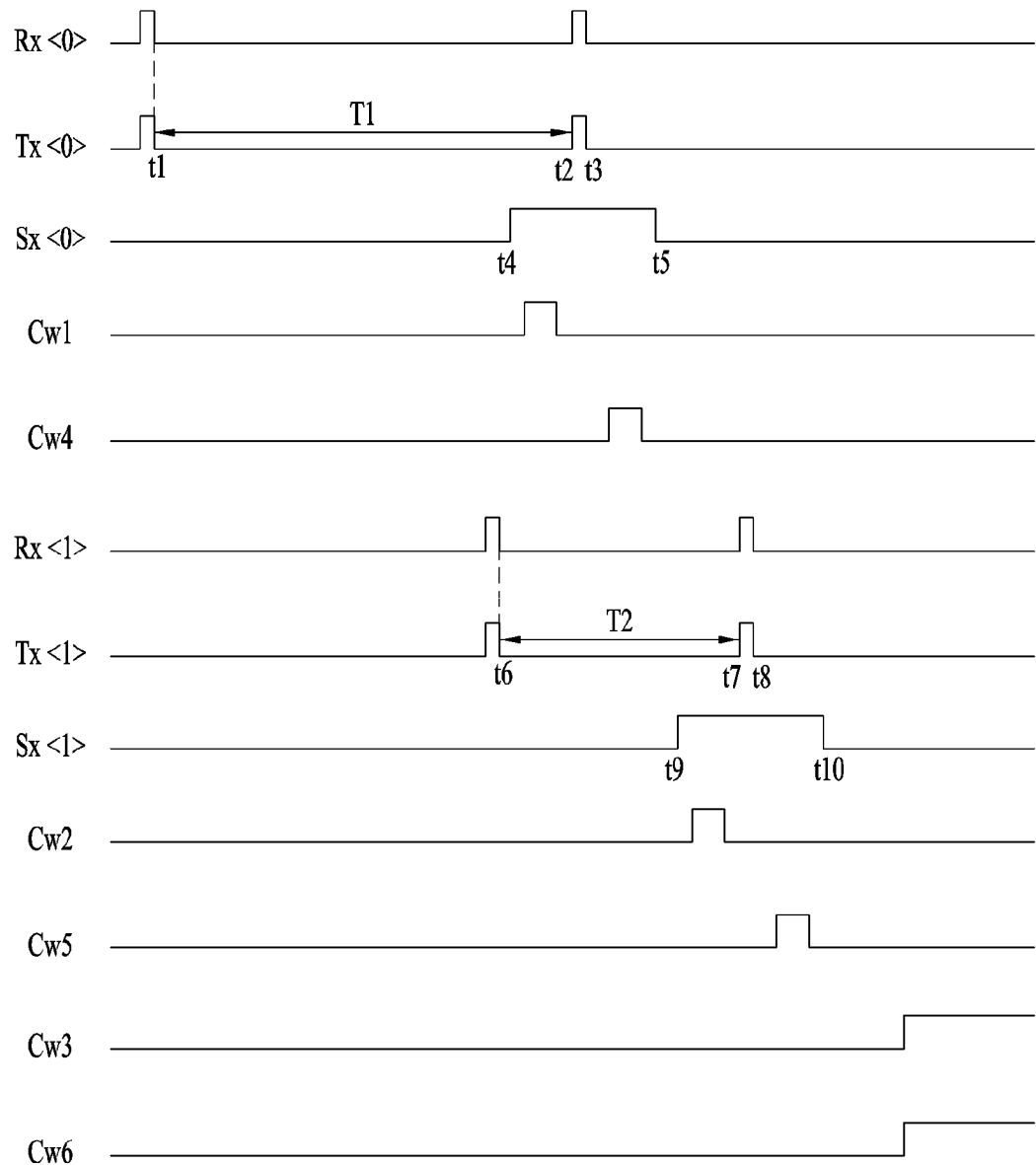
FIG. 6 is a timing diagram explaining an exemplary operation of the exemplary first binning sampling unit illustrated in FIG. 3.

FIG. 6 is a timing diagram explaining operation(s) of the first binning sampling unit 130-1 illustrated in FIG. 5.

First, timing of signals RX<0>, TX<0>, SX<0>, CW1, and CW4 for sampling of the first reset sensing signal and first image sensing signal of the first unit pixel P11 will be described with reference to FIG. 6.

In response to simultaneous transitions of the first reset signal RX<0> and first transfer signal TX<0> from an inactive state to an active state (e.g., from a second level to a first level), the photodiode 210 of the first unit pixel P11 is reset. When the first reset signal RX<0> and first transfer signal TX<0> transition from the active state to the inactive state (e.g., from the first level to the second level (e.g., at time t1), the reset operation of the photodiode 210 of the first unit pixel P11 may end.

The first select signal SX<0> may transition from an inactive state to an active state (e.g., from the second level to the first level) at a time t4, after the photodiode 210 of the first unit pixel P11 is reset, but before a time t2 when the first transfer signal TX<0> transitions from an inactive state to an active state (e.g., from the second level, which may be a logic low level, to the first level, which may be a logic high level).

Meanwhile, the first select signal SX<0> may transition from the active state to the inactive state (e.g., from the first level to the second level) at a time t5, after the first transfer signal TX<0> transitions from the active state to the inactive state (e.g., from first level to the second level). Alternatively or additionally, the first reset signal RX<0> may transition from an inactive state to an active state (e.g., from a second level to a first level) at the same time as the first transfer signal TX<0>.

The first switch control signal CW1 may transition from an inactive state to an active state (e.g., from the second level to the first level) after the first select signal SX<0> transitions from the inactive state to the active state (e.g., from the second level to the first level). Meanwhile, the first switch control signal CW1 may transition from the active state to the active state (e.g., from the first level to the second level) before the time t2.

The fourth switch control signal CW4 may transition from an inactive state to an active state (e.g., from the second level to the first level) after the first transfer signal TX<0> and/or the first reset signal RX<0> transition from the inactive state to the active state (e.g., from a second level to a first level at the time t3), and may transition from the first level to the second level before the first select signal SX<0> transitions from the active state to the inactive state (e.g., from the first level to the second level) at time t5.

The exposure time of the first unit pixel P11 (namely, an exposure time T1) may be the period from the time t1 at which the photodiode 210 reset operation ends to the time t2 when electrical charges or carriers generated by light received by the photodiode 210 are transferred to the floating diffusion region FD of the first unit pixel P11.

Next, timing of signals RX<1>, TX<1>, SX<1>, CW2, and CW5 for sampling of the second reset sensing signal and second image sensing signal of the second unit pixel P21 will be described.

In response to the simultaneous transition of the second reset signal RX<1> and second transfer signal TX<1> from an inactive state to an active state (e.g., from the second level to the first level), the photodiode 210 of the second unit pixel P21 is reset. When the second reset signal RX<1> and second transfer signal TX<1> transition from the active state to the inactive state (e.g., from the first level to the second level), the reset operation of the photodiode 210 of the second unit pixel P21 may end.

The time t6 when the second reset signal RX<1> transitions from the active state to the inactive state (e.g., from the first level to the second level) may precede the time t4 when the first select signal SX<0> transitions from the inactive state to the active state.

The second select signal SX<1> may transition from an inactive state to an active state (e.g., from the second level to the first level) after the reset operation of the photodiode 210 of the second unit pixel P21 ends, but before the second transfer signal TX<1> transitions from an inactive state to an active state (e.g., from the second level to the first level).

Meanwhile, the second select signal SX<1> may transition from the active state to the inactive state (e.g., from the first level to the second level after the second transfer signal TX<1> transitions from the active state to the inactive state (e.g., from the first level to the second level) at time t8. Alternatively or additionally, the second reset signal RX<1> may transition from an inactive state to an active state (e.g., from a second level to a first level) and from the active state to the inactive state (e.g., from the first level to the second level) at the same time as the first transfer signal TX<0>.

The second switch control signal CW2 may transition from an inactive state to an active state (e.g., from the second level to the first level) after the second transfer signal TX<1> transitions from the inactive state to the active state (e.g., from the first level to the second level) at time t8. Meanwhile, the second switch control signal CW2 may transition from the active state to the active state (e.g., from the first level to the second level) before the time t7.

The fifth switch control signal CW5 may transition from an inactive state to an active state (e.g., from the second level to the first level) after the time t8, and may transition from the active state to the inactive state (e.g., from the first level to the second level) before the second select signal SX<1> transitions from an inactive state to an active state (e.g., from the first level to the second level) at time t9.

The exposure time of the second unit pixel P21 (namely, an exposure time T2) may be the period from the time t6 at which the reset operation of the photodiode 210 of the second unit pixel P21 ends (e.g., time t6) to the time t7 when the electrical charges or carriers generated by light received by the photodiode 210 are transferred to the floating diffusion region FD of the second unit pixel P21.

The first exposure time T1 of the first unit pixel P11 may differ from the second exposure time T2 of the second unit pixel P21. For example, the ratio of the first exposure time T1 to the second exposure time T2 may be 3:1, although the present disclosure is not limited thereto.

That is, the ratio of the first period T1 between the times t1 and t2 to the second period T2 between the times t6 and t7 may be 3:1.

Next, timing of the signals CW3 and CW6 for calculation of an average of the first and second reset sensing signals and an average of the first and second image sensing signals will be described.

Each of the third switch control signal CW3 and fourth switch control signal CW6 may transition from an inactive state to an active state (e.g., from the second level to the first level) after the second select signal SX<1> transitions from the active state to the inactive state at time t9. The third and fourth switch control signals CW3 and CW6 may transition from the inactive state to the active state (e.g., from the second level to the first level) simultaneously or sequentially.

Since the exposure times of the first unit pixel P11 and second unit pixel P21 differ from each other, the first binning sampling unit 130-1 may calculate or determine the average value weighted by or according to rows.

The analog-to-digital converter 140 converts analog signals from the binning sampling unit 130, namely, the first binning sampling signal B11, B21, . . . or Bm1 and second binning sampling signal B12, B22, . . . or Bm2, into digital signals.

For example, the analog-to-digital converter 140 may generate a digital signal from the first binning sampling signal B11, B21, . . . or Bm1 from the first averaging unit 310 and the second binning sampling signal B12, B22, . . . or Bm2 from the second averaging unit 320.

In one embodiment, the analog-to-digital converter 140 may further comprise one or more comparators (not shown) configured to compare the first binning sampling signal B11, B21, . . . or Bm1 with the second binning sampling signal B12, B22, . . . or Bm2, and output a comparison signal (e.g., according to a result of the comparison). The analog-to-digital converter 140 may further comprise one or more counters (not shown) configured to perform a counting operation on the comparison signal(s), and generate a digital code based on the counting operation.

The analog-to-digital converter 140 may perform correlated double sampling (CDS) in order to remove intrinsic fixed pattern noise from the pixels.

In embodiment(s) of the invention, of course, averaging of reset sensing signals and image sensing signals from two or more different unit pixels may be performed before the above-described analog-to-digital conversion, to achieve binning. In this case, analog-to-digital conversion may be performed using the averaged reset sensing signals and the averaged image sensing signals.

In embodiment(s) of the invention, a weight for binning may be applied to the reset sensing signals and image sensing signals from two or more different unit pixels of the same column by making the unit pixels have different exposure times. Thus, the binning sampling unit 130 may perform weighted averaging.

In embodiment(s) of the invention, it is unnecessary to provide a separate line memory for binning after analog-to-digital conversion because vertically weighted binning is performed on outputs of two or more different unit pixels of the same column in the pixel array 120 by the binning sampling unit 130 before analog-to-digital conversion, to obtain a weighted average.

In embodiment(s) of the invention, weighted averaging is completed by the binning sampling unit 130 before analog-to-digital conversion and, as such, it may be possible to reduce the number of analog-to-digital conversions, thereby achieving an enhancement in analog-to-digital conversion rate.

In addition, in embodiment(s) of the invention, there is no jagged edge and, as such, an improvement in dynamic range of the image sensor may be achieved.

Figure 7:
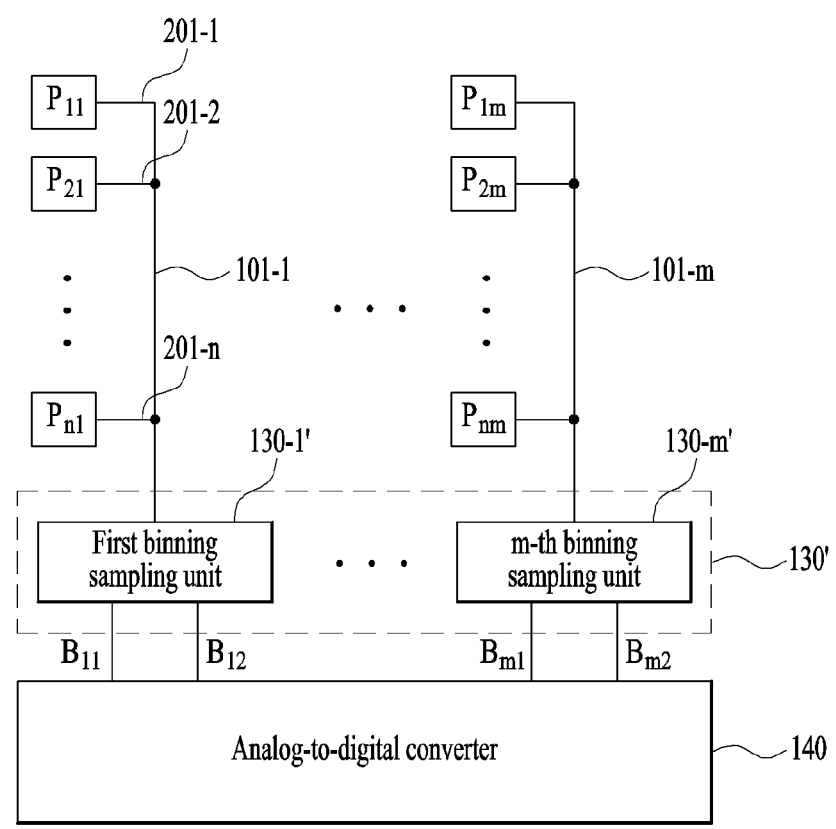
FIG. 7 is a block diagram of an exemplary image sensor according to one or more other embodiments of the present invention.
Figure 8:
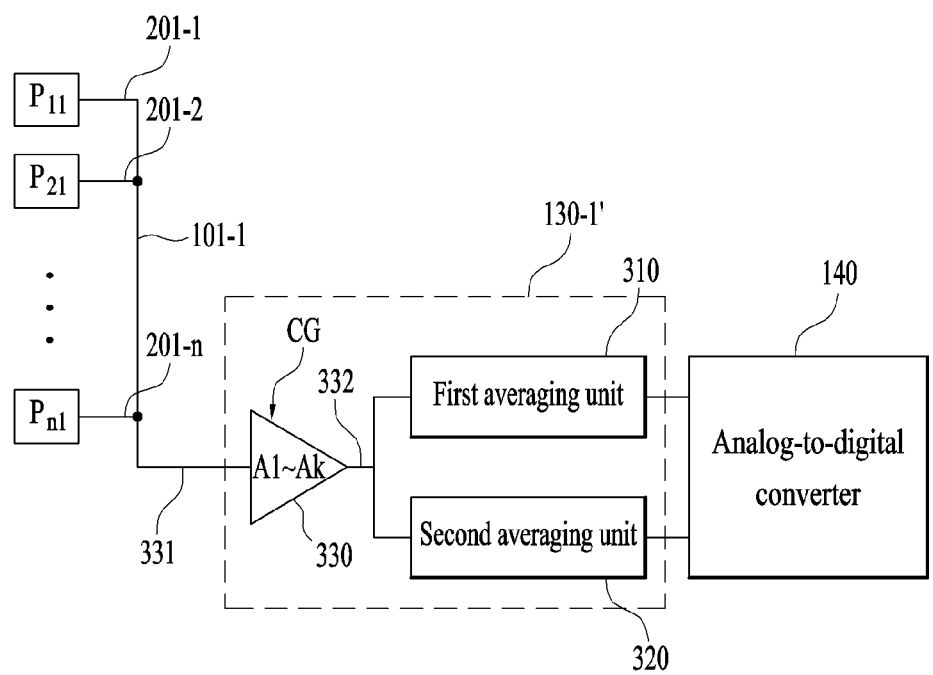
FIG. 8 is a diagram illustrating an exemplary first binning sampling unit suitable for use in the exemplary image sensor illustrated in FIG. 7 according to one or more embodiments of the invention.

FIG. 7 is a block diagram of an exemplary image sensor according to one or more other embodiments. FIG. 8 illustrates an embodiment of an exemplary first binning sampling unit 130-1' suitable for us in the exemplary image sensor illustrated in FIG. 7. In FIGS. 7 and 8, the same reference numerals as those of FIGS. 1 to 4 designate the same constituent elements. These constituent elements will not be described in detail in the following description.

Referring to FIGS. 7 and 8, the exemplary image sensor includes a timing controller, a pixel array 120, a binning sampling unit 130', and an analog-to-digital converter 140. In FIG. 7, illustration of the timing controller (which can be the same as timing controller 110 in FIG. 1) is omitted.

Although exposure times of the first and second unit pixels in the embodiment illustrated in FIG. 2 are different, exposure times of the first and second unit pixels in the embodiment illustrated in FIG. 7 are equal. That is, in the timing diagram of FIG. 6, the first exposure time T1 between the times t1 and t2 may be equal to the second exposure time T2 between the times t6 and t7.

In FIG. 7, weighted averaging for binning may be performed by a variable amplifying unit 330, as will be described later.

The binning sampling unit 130' may include first to m-th binning sampling units 130-1' to 130-$m$'. The first to m-th binning sampling units 130-1' to 130-$m$' may be identical and, as such, the following description will be given only in conjunction with one of the binning sampling units (that is, the first binning sampling units 130-1').

The first binning sampling unit 130-1' includes a variable amplifying unit 330, a first averaging unit 310, and a second averaging unit 320, which are connected to a corresponding one of a plurality of sensing lines.

The first and second averaging units 310 and 320 may be identical to those of FIG. 2. That is, the first averaging unit 310 may include a first switching unit 312 and first and second capacitors Cr1 and Cr2, and the second averaging unit 320 may include a second switching unit 314 and third and fourth capacitors Cs1 and Cs2.

The first switching unit 312 may include first to third switches SW1 to SW3. In response to first to third switch control signals CW1 to CW3, the first switching unit 312 may connect one of the first capacitor Cr1 and the second capacitor Cr2 to an output terminal 332 of the variable amplifying unit 330, disconnect the first and second capacitors Cr1 and Cr2 from the output terminal 332 of the variable amplifying unit 330, and/or connect the first and second capacitors Cr1 and Cr2 to each other.

The second switching unit 314 may include fourth to sixth switches SW4 to SW6. In response to fourth to sixth switch control signals CW4 to CW6, the second switching unit 314 may connect one of the third capacitor Cs1 and the fourth capacitor Cs2 to the output terminal 332 of the variable amplifying unit 330, disconnect the third and fourth capacitors Cs1 and Cs2 from the output terminal 332 of the variable amplifying unit 330, or connect the third and fourth capacitors Cs1 and Cs2 to each other.

An input terminal 331 of the variable amplifying unit 330 may be connected to one or more output stages of a plurality of unit pixels in or of a corresponding column of the pixel array (for example, output stages 201-1 to 201-$n$). For example, the input terminal 331 of the variable amplifying unit 330 may be connected to a corresponding one of the sensing lines 101-1 to 101-$m$ (that is, the sensing line 101-1).

In response to a gain control signal CG supplied from the timing controller 110, the variable amplifying unit 330 may amplify, with different gains, signals from two or more unit pixels selected from among the unit pixels P11 to Pn1, P12 to Pn2, . . . or P1$m$ to Pn$m$ of a corresponding column of the pixel array 120.

The variable amplifying unit 330 may amplify, with different gains, reset sensing signals and image sensing signals from two or more unit pixels selected from among the unit pixels of a corresponding column of the pixel array 120. For example, the number of the selected unit pixels may be two. In this case, the selected unit pixels may be of the same color.

For example, the variable amplifying unit 330 may amplify a first reset sensing signal and a first image sensing signal output from the first unit pixel with a first gain, and may output the amplified first reset sensing signal and the amplified first image sensing signal.

In addition, the variable amplifying unit 330 may amplify a second reset sensing signal and a second image sensing signal output from the second unit pixel with a second gain, and may output the amplified second reset sensing signal and the amplified second image sensing signal.

The first gain and second gain may be different. For example, the ratio between the first and second gains may be 3:1, although the present disclosure is not limited thereto.

The variable amplifying unit 330 may be a programmable amplifier with a plurality of predetermined gains A1 to Ak (where k is a natural number of at least 2).

When the first reset sensing signal or first image sensing signal from the first unit pixel is output to the first sensing line 101-1, the variable amplifying unit 330 may have a first gain (e.g., set by the timing controller; see FIG. 1). When the second reset sensing signal or second image sensing signal from the second unit pixel is output to the first sensing line 101-1, the variable amplifying unit 330 may have a second gain (e.g., also set by the timing controller).

In embodiment(s) of the invention, a weight for binning may be applied to the reset sensing signals and image sensing signals from two different unit pixels of the same column by varying the gain of the variable amplifying unit 330. Thus, the binning sampling unit 130' may perform weighted averaging.

In embodiment(s) of the invention, it is unnecessary to provide a separate line memory for binning because weighted averaging is completed by the binning sampling unit 130' before analog-to-digital conversion. In addition, it may be possible to reduce the number of analog-to-digital conversions, thereby achieving an enhancement in analog-to-digital conversion rate.

The embodiments as described above may include particular features, structures, or characteristics, but not every embodiment necessarily includes the particular features, structures, or characteristics. Furthermore, the particular features, structures or characteristics in each embodiment may be combined in any suitable manner, as would be apparent to one of ordinary skill in the art from this disclosure, in one or more embodiments. Therefore, combinations of features of different embodiments are meant to be within the scope of the invention.

What is claimed is:

1. An image sensor comprising:
   a pixel array comprising a plurality of unit pixels in a matrix having rows and columns;
   a sensing line connected to one or more output stages of or in one of the columns;
   a binning sampling unit configured to output a binning sampling signal according to an average of signals from two or more unit pixels among the unit pixels in a corresponding one of the columns; and
   an analog-to-digital converter configured to convert the binning sampling signal to a digital signal,
   wherein the two or more unit pixels have different exposure times and are of a same pixels,
   the signal from each of the two or more unit pixels is a reset sensing signal or an image sensing signal, the reset sensing signal is a signal from the unit pixel when the unit pixel is reset, and the image sensing signal is a signal from the unit pixel in accordance with an image signal,
   the binning sampling unit comprises:
     a first averaging unit configured to calculate or determine an average of the reset sensing signals and output a first binning sampling signal according to the average of the reset sensing signals; and
     a second averaging unit configured to calculate or determine an average of the image sensing signals and output a second binning sampling signal according to the average of the image sensing signals, and
   the first averaging unit comprises:
     a first capacitor receiving a first reference voltage;
     a second capacitor receiving the first reference voltage;
     a first switch between the first capacitor and the sensing line;
     a second switch between the second capacitor and the sensing line; and
     a third switch between the first capacitor and the second capacitor.

2. The image sensor according to claim 1, wherein the two or more unit pixels consist of two unit pixels.

3. The image sensor according to claim 2, wherein exposure times of the two unit pixels have a ratio of 1:3.

4. The image sensor according to claim 1, wherein the first to third switches are configured to store (i) a first reset sensing signal from one of the two or more unit pixels in the first capacitor, and (ii) a second reset sensing signal from another of the two or more unit pixels in the second capacitor.

5. The image sensor according to claim 1, wherein the second averaging unit comprises:
   a third capacitor receiving a second reference voltage;
   a fourth capacitor receiving the second reference voltage;
   a fourth switch between the third capacitor and the sensing line;
   a fifth switch between the fourth capacitor and the sensing line; and
   a sixth switch between the third capacitor and the fourth capacitor.

6. The image sensor according to claim 5, wherein the fourth to sixth switches are configured to store (i) a first image sensing signal from the one of the two or more unit pixels in the third capacitor, and (ii) a second image sensing signal from the other of the two or more unit pixels in the fourth capacitor.

7. The image sensor according to claim 1, comprising a plurality of binning sampling units, each configured to output said binning sampling signal from the two or more unit pixels in a unique one of said columns.

8. An image sensor comprising:
   a pixel array comprising a plurality of unit pixels in a matrix having rows and columns;
   a binning sampling unit configured to amplify signals from two or more unit pixels from among the unit pixels of one of the columns with different gains, and output a binning sampling signal according to an average of the amplified signals; and
   an analog-to-digital converter configured to convert the binning sampling signal to a digital signal,
   wherein the signal from each of the two or more unit pixels is a reset sensing signal or an image sensing signal, the reset sensing signal is a signal from the unit pixel when the unit pixel is reset, and the image sensing signal is a signal from the unit pixel in accordance with an image signal, and
   wherein the binning sampling unit comprises:
     a variable amplifying unit configured to amplify the reset sensing signals and image sensing signals from the two or more unit pixels, and output the amplified reset sensing signals and the amplified image sensing signals, a first averaging unit configured to calculate or determine an average of the amplified reset sensing signals, and a second averaging unit configured to calculate or determine an average of the amplified image sensing signals; and wherein the variable amplifying unit amplifies the reset sensing signals from the two or more unit pixels with different gains, and amplifies the image sensing signals from the two or more unit pixels with different gains.

9. The image sensor according to claim 8, further comprising:

a sensing line connected to one or more output stages of or in one of the columns, wherein the two or more unit pixels consist of two unit pixels, and the two unit pixels are of a same color.

10. The image sensor according to claim 9, wherein:

the variable amplifying unit amplifies, with a first gain, a first reset sensing signal and a first image sensing signal, which are supplied from one of the selected unit pixels via the sensing line; and the variable amplifying unit amplifies, with a second gain, a second reset sensing signal and a second image sensing signal, which are supplied from the other of the selected unit pixels via the sensing line.

11. The image sensor according to claim 8, wherein:

the first averaging unit comprises a first capacitor receiving a first reference voltage, a second capacitor receiving the first reference voltage, and a first switching unit configured to connect one of the first and second capacitors to an output terminal of the variable amplifying unit, disconnect the first and second capacitors from the output terminal of the variable amplifying unit, and/or connect the first and second capacitors to each other; and the second averaging unit comprises a third capacitor receiving a second reference voltage, a fourth capacitor receiving the second reference voltage, and a second switching unit configured to connect one of the third and fourth capacitors to an output terminal of the variable amplifying unit, disconnect the third and fourth capacitors from the output terminal of the variable amplifying unit, and/or connect the third and fourth capacitors to each other.

12. The image sensor according to claim 8, comprising a plurality of binning sampling units, each configured to output said binning sampling signal from the two or more unit pixels in a unique one of said columns.

* * * * *